United States Patent Office 3,639,403
Patented Feb. 1, 1972

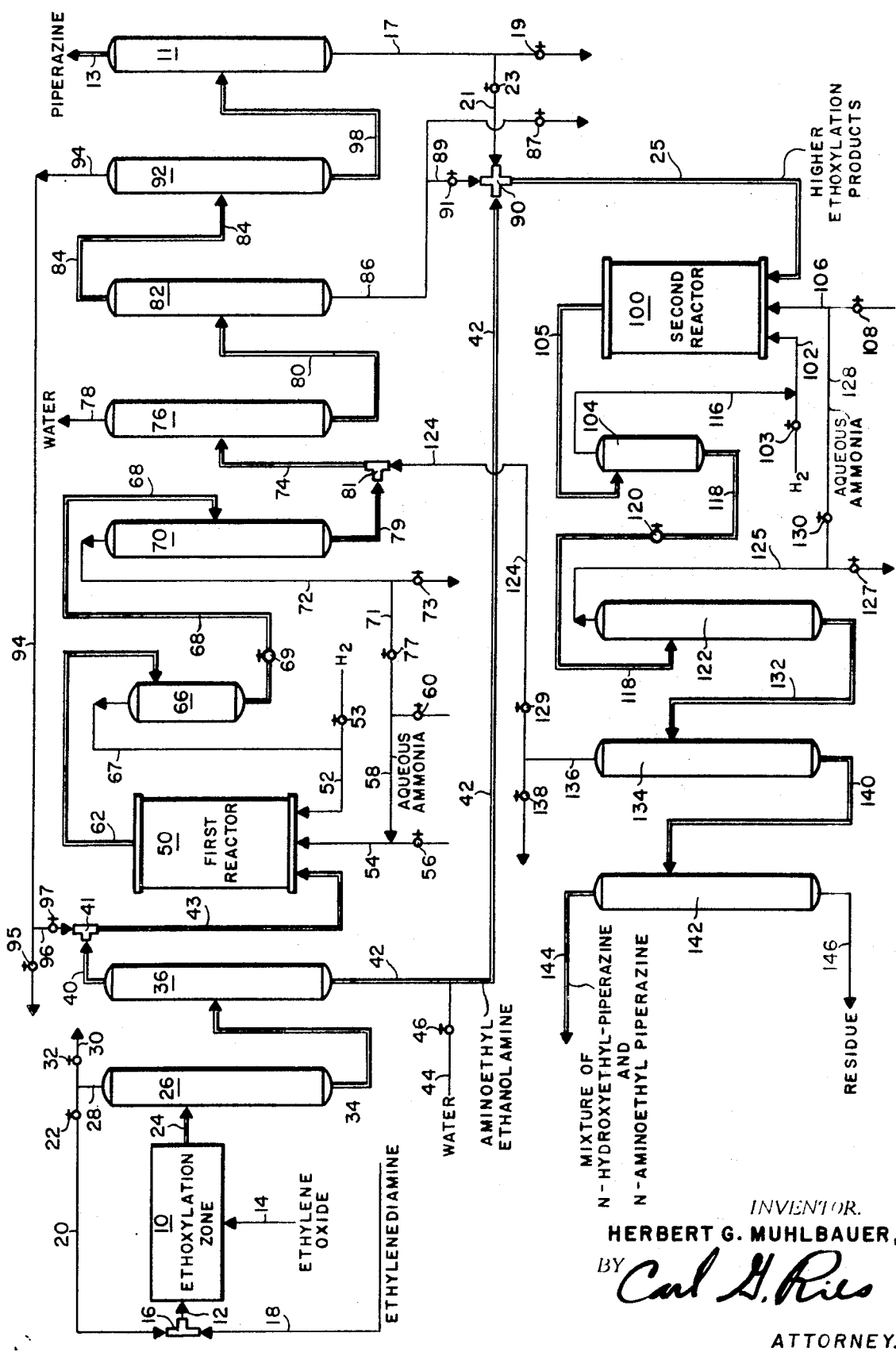

3,639,403
**METHOD FOR THE PREPARATION OF PIPER-
AZINE AND SUBSTITUTED PIPERAZINES**
Herbert George Muhlbauer, Austin, Tex., assignor to
Jefferson Chemical Company, Inc., Houston, Tex.
Filed Mar. 26, 1969, Ser. No. 810,737
Int. Cl. C07d 51/70
U.S. Cl. 260—268 SY         4 Claims

ABSTRACT OF THE DISCLOSURE

An improved method for preparing piperazine and N-substituted piperazines from an ethylene oxide-ethylenediamine reaction product characterized by a more efficient use of by-products of the ethylene oxide-ethylenediamine reaction.

BACKGROUND OF THE INVENTION (1) Field of the invention

This invention relates to the production of piperazine. More particularly, it relates to a method wherein (1) ethylene oxide is reacted with ethylenediamine to provide a reaction product composed principally of aminoethylethanolamine and higher condensation products thereof, wherein (2) the aminoethylethanolamine and the higher condensation products are separately cyclized in the presence of hydrogen a hydrogenation catalyst, and, optionally, ammonia to provide separate products comprising piperazine, N-aminoethylpiperazine and N-hydroxyethylpiperazine and wherein (3) the purification of the two reaction products is conducted in the combination so as to maximize the yield of useful products and to minimize problems of purification.

(2) Description of the prior art

Prior to the present invention, it was known that aminoethylethanolamine could be produced by the reaction of ethylene oxide with a molar excess of ethylenediamine.

It was also known, as illustrated, for example, by Marschall U.S. Patent No. 3,112,317, Wilkes U.S. Patent No. 2,479,657 and Pfann U.S. Patent No. 2,427,473 to prepare piperazine by the catalytic cyclization (i.e., reductive amination) of aminoethylethanolamine in the presence of hydrogen and a hydrogenation catalyst, such as a nickel-copper-chromia catalyst of the type disclosed in Moss U.S. Patent No. 3,152,998.

It was further known prior to the present invention and illustrated, for example, by Moss et al. U.S. Patent No. 3,151,115 and Muhlbauer et al. U.S. Patent No. 3,297,700 to conduct a reductive amination so as to simultaneously produce both piperazine and N-aminoethylpiperazine. As shown, for example, by the said Moss et al., U.S. Patent No. 3,151,115, a reductive amination of this nature will result in the formation of a wide variety of product components. This greatly complicates the recovery of purified components because the boiling characteristics of the components of the reaction product and this creates a severe problem in attempting to improve the yield of the desired products from the feedstock.

For instance, Moss et al. U.S. Patent No. 3,151,115 shows the production of eleven identified amines from monoethanolamine including, for example, ethylenediamine, piperazine (which is useful in the preparation of anthelmintic compositions), N-aminoethylpiperazine and N-hydroxyethylpiperazine (which are useful as feedstocks for the preparation of triethylenediamine) and aminoethylethanolamine (i.e., 2 - (2 - aminoethylamino)-ethanol). Aminoethylethanolamine and N-hydroxyethylpiperazine both boil at 242° C.

SUMMARY OF THE INVENTION

Even when ethylene oxide is reacted with a gross molar excess of ethylenediamine, a heterogeneous reaction product is formed containing not only aminoethylethanolamine, but also higher molecular weight ethylene oxide-ethylenediamine reaction products. This is, at least in part, attributable to the highly reactive nature of ethylene oxide, ethylenediamine and aminoethylethanolamine. Thus, when ethylene oxide is reacted with four mols or more of ethylenediamine per mol of ethylene oxide, the reaction mixture will be composed not only of aminoethylethanolamine, but also products such as N,N-dihydroxyethyl ethylenediamine, N,N'-dihydroxyethyl ethylenediamine, N,N,N'-trihydroxyethyl ethylenediamine, N,N,N',-N'-tetrahydroxyethyl ethylenediamine, etc. Moreover, aminoethylethanolamine cannot be substantially completely separated from the higher condensation products at reasonable cost without a significant loss in yield.

In like manner, even though aminoethylethanolamine is an excellent feedstock for the preparation of piperazine as shown, for example, by the said Pfann patent, the reaction is not so selective as would appear from the equation given in the patent. For example, the reductive amination of the aminoethylethanolamine, even under comparatively mild condition, results in the formation not only of piperazine but also smaller amounts of by-products such as ethylenediamine, monoethanolamine, diethylenetriamine, N-aminoethylpiperazine, N-hydroxyethylpiperazine, aminoethylethanolamine, etc.

Aminoethylethanolamine, piperazine, N - aminoethylpiperazine and N-hydroxyethylpiperazine are useful products. In accordance with the present invention, the four products are simultaneously produced from ethylenediamine and ethylene oxide by a sequential process which involves steps of:

(1) Reacting ethylene oxide with a molar excess of ethylenediamine (e.g., 2–10 mols of ethylenediamine per mol of ethylene oxide). The reaction mixture comprises unreacted ethylenediamine, aminoethylethanolamine and higher condensation products thereof;

(2) Separation of the ethylene oxide-ethylenediamine reaction product into a recycle ethylenediamine fraction, a substantially pure aminoethylethanolamine fraction and a heavier fraction comprising higher condensation products and aminoethylethanolamine;

(3) Cyclization of the aminoethylethanolamine fraction in the presence of a hydrogenation catalyst and hydrogen (to which ammonia is optionally added) in a first reaction zone to provide a reaction mixture comprising piperazine, amine components having boiling points below the boiling point of piperazine and amine components including aminoethylethanolamine, hydroxyethylpiperazine and N-aminoethylpiperazine having boiling points higher than the boiling point of piperazine;

(4) Separation of the aminoethylethanolamine reaction product into lower boiling recycle fraction, a purified piperazine product fraction and a fraction comprising components having boiling points higher than the boiling point of piperazine;

(5) Cyclization of the higher condensation product fraction from the ethylenediamine ethylene oxide reaction alone or in admixture with at least a part of the higher boiling fractions produced during cyclization of the aminoethylethanolamine in the presence of a hydrogenation catalyst and hydrogen (to which an ammonia is preferably added) in a second reaction zone to provide a second reaction product comprising piperazine, N-hydroxyethylpiperazine and N-aminoethylpiperazine; and (6) Recovery of piperazine, N-hydroxyethylpiperazine and N-aminoethylpiperazine from the reaction products formed by the second cyclization reaction.

DESCRIPTION OF THE INVENTION

As indicated, the initial feed materials for the process of the present invention are ethylene oxide and ethylenediamine which are reacted noncatalytically in a suitable ethoxylation zone such as a tubular reactor to provide an ethoxylation product composed principally of aminoethylethanolamine. This is most conveniently accomplished by using a large excess ethylenediamine such as 2–10 mols, and more preferably, 3–5 mols, of ethylenediamine per mol of ethylene oxide.

The ethoxylation product will comprise unreacted ethylenediamine, aminoethylethanolamine, and higher condensation products such as the di-, tri- and tetrahydroxyethyl derivatives of ethylenediamine. The ethoxylation product is separated in any suitable manner, such as by fractional distillation, in a manner to be described, so as to provide:

(1) Fraction One—an ethylenediamine recycle fraction.

(2) Fraction Two—an aminoethylethanolamine distillate fraction consisting essentially of aminoethylethanolamine which may, however, contain minor amounts of impurities such as ethylenediamine.

(3) Fraction Three—a higher boiling fraction comprising the di-, tri-, and tetrahydroxyethyl derivatives of ethylenediamine and, also normally, a significant quantity of aminoethylethanolamine.

It is a feature of the present invention that the higher boiling Fraction Three may contain significant quantities of aminoethylethanolamine without adversely, significantly affecting the overall economics of the process because of the manner in which Fraction Three is subsequently treated. It is another feature of the present invention that the aminoethylethanolamine distillate Fraction Two is significantly free of the higher condensation product whereby it may more advantageously be converted to piperazine.

In accordance with the present invention, Fraction Two and Fraction Three are separately cyclized in the presence of a hydrogenation catalyst to form piperazine and N-substituted piperazines together with other reaction by-products.

Any suitable hydrogenation catalyst may be used such as, for example, a catalyst containing one or more substances selected from a group consisting of copper, nickel, cobalt, chromium, molybdenum, manganese, platinum, palladium, rhodium and mixtures of such metals and/or their oxides. These catalysts, also sometimes known as hydrogenation-dehydrogenation catalysts, are suitably employed in combination with oxides of metals which are not reduced by hydrogen under the reaction conditions employed as, for example, chromium oxide, molybdenum oxide, manganese oxide, etc.

The preferred catalysts comprise a mixture of nickel and/or cobalt with copper and one of the non-reducible metal oxides, preferably chromium oxide. More particularly, such a catalyst will be composed, on an oxide-free basis of from about 60 to 85 mol percent nickel or cobalt or both, about 14 to 37 mol percent copper and about 1 to 5 mol percent of a non-reducible metal oxide such as chromium oxide, manganese oxide, molybdenum oxide or thorium oxide. Chromium oxide (chromia) is preferred. Such catalysts are preferably initially prepared in the form of their oxides and then treated with hydrogen prior to use for reduction of at least a portion of the nickel, and/or cobalt and copper to the metallic form. As indicated, chromium oxide will not be reduced to the metal by such treatment.

In accordance with the present invention, aminoethylethanolamine Fraction Two is contacted with hydrogen and a hydrogenation catalyst in a reaction zone under suitable conditions of temperature and pressure to promote the cyclization of the aminoethylethanolamine to piperazine. Such reaction conditions will include, for example, a reaction pressure of from about 2,000 up to about 10,000 lbs. per square inch or more, including a hydrogen partial pressure constituting at least 80% of the total pressure, the temperature within the range of about 100° to about 220° C. in a space velocity within the range of about 0.1 to about 2 lbs. of feed per hour per lb. of catalyst. The reaction is preferably conducted under aqueous condition using about 10 to about 120 wt. percent of water based on the aminoethylethanolamine. Ammonia is not essential to the reaction, but may be included if desired. When ammonia is used, it is preferably used in a mol ratio of about one to five mols ammonia per mol of aminoethylethanolamine. Preferably, the reaction conditions are adjusted so as to provide for a comparatively high conversion of aminoethylethanolamine, such as a conversion of about 70% to about 90%.

Under the aforesaid reaction conditions, a reaction mixture will be formed comprising cyclization, condensation and cracking products including, for example, monoethanolamine, ethylenediamine, piperazine, diethylenetriamine, N-aminoethylpiperazine, aminoethylethanolamine, N-hydroxyethylpiperazine, etc. When the reaction is conducted under the preferred reaction conditions, the reaction mixture will normally contain about 20 to about 25 wt. percent of piperazine, which will be the predominant amine reaction component.

The aminoethylethanolamine reaction product is separated in any suitable fashion, such as by distillation in a manner to be described, into (A) a water fraction, (B) a light recycle fraction comprising ethylenediamine which is suitably recycled, (C) a purified piperazine fraction and (D) one or more fractions comprising higher boiling reaction products including diethylenetriamine, N-aminoethylpiperazine, aminoethylethanolamine and N-hydroxyethylpiperazine. A minor amount of piperazine, ethylene diamine and monoethanolamine may also be present in these fractions.

Still further in accordance with the present invention, Fraction Three, supra, obtained from the ethoxylation of ethylenediamine, as above described, is cyclized alone, or in a mixture with the higher boiling by-product fractions from the aminoethylethanolamine cyclization so as to provide a second cyclization reaction product comprising piperazine, N-hydroxyethylpiperazine, N-aminoethylpiperazine, and other reaction by-products.

This second cyclization reaction product is fractionated in any suitable manner, such as the manner to be described, so as to provide a distillate fraction comprirsing piperazine which may suitably be recycled to the piperazine recovery facility for recovering piperazine from the first cyclization reaction product, one or more product fractions composed of N-hydroxyethylpiperazine and/or N-aminoethylpiperazine product fraction, and a heavy residue fraction which is suitably purged from the system.

DESCRIPTION OF A PREFERRED EMBODIMENT

The invention will be further illustrated in connection with the accompanying drawing which is a schematic flow sheet illustrating one preferred mode of practicing the process of the present invention.

In the flow sheet, since it is schematic, and in order to simplify the prescription, conventional auxiliary equipment such as pumps, valves, reboilers, reflux condensers, flow control elements, etc. have been omitted inasmuch as they are conventional and known to those skilled in the art.

Turning now to the drawing, there is shown, schematically, an ethoxylation zone 10. Fresh ethylenediamine is charged by way of a line 18 and recycled ethylenediamine (obtained in a manner to be described) is charged by a line 20 to a manifold 16, together with ethylene oxide which is charged by way of line 14. Preferably, a total of from about three to five mols of ethylenediamine may be fresh ethylenediamine charged to manifold 16 by way of feed line 18, or recycle ethylenediamine charged to manifold 16 by way of a recycle line 20.

The ethoxylation is conventionally conducted (e.g., non-catalytically) at a temperature of about 40° to about 120° C. and with a residence time sufficient to ensure complete reaction of the ethylene oxide.

The ethoxylation reaction product is discharged from zone 10 by way of a line 24 leading a first fractionation zone 26, which is suitably a vacuum distillation zone, wherein the ethoxylation product is separated into a first overhead fraction 28 comprising unreacted ethylenediamine. If desired, all of the portion of the ethylenediamine fraction 28 may be discharged from the system by a purge line 30 controlled by a valve 32 or the fraction 28 may be recycled to manifold 16 by line 20, controlled by valve 22, as mentioned.

The bottoms fraction from the column 26 is discharged by way of the line 34 to a second distillation column 36 which is preferably a vacuum distillation column wherein it is separated into an overhead fraction 40 consisting essentially of aminoethylethanolamine and a bottoms fraction 42 composed of aminoethylethanolamine, the di-, tri- and tetrahydroxyethyl derivatives of ethylenediamine and other residue components.

Since the fraction 42 will normally be solid at ambient temperatures, it is either necessary that the line 42 be jacketed or, more preferably, that water be introduced at the line 42 (e.g., by a line 44 controlled by a valve 46) in an amount sufficient to lower the freezing point of the mixture. Thus, for example, from 10 to about 100 wt. percent of water based on fraction 42 may be added to the line 44. The stream 42 is charged to a manifold 90 for further treatment in accordance with the present invention in a manner to be described.

In accordance with the present invention, the aminoethylethanolamine distillate fraction 40 is charged to a manifold 41 and thence by a line 43 to a first reaction zone 50 containing a suitable hydrogenation catalyst such as a nickel, copper, chromia catalyst containing, on an oxide-free basis, about 75 mol percent nickel, about 23 mol percent copper and about 2 mol percent chromia. Hydrogen is charged to this first reaction zone 50 by way of a hydrogen charge line 52 controlled by a valve 53 and water is charged by way of line 54 controlled by a valve 56. Preferably, ammonia is used in the reaction and is charged to the first reaction zone 50 as aqueous ammonia through an ammonia charge line 58 controlled by a valve 60.

Suitable reaction conditions are established in the first reaction zone 50 such as the temperature within the range of about 140° to about 200° C., a pressure of about 2,500 to about 5,000 p.s.i.g. and a flow rate of about 1 lb. of feed per hour per lb. of catalyst.

The effluent from the first cyclization reactor 50 is discharged by way of the line 62 leading to a surge drum 66 from which hydrogen is separated by way of the line 67 for recycle.

The liquid reaction product from the surge drum 66 is discharged by way of the line 68 containing pressure reduction valve 69 leading to a first distillation zone 70. The feed material in the line 68 will comprise water, ammonia, ethylenediamine, piperazine, monoethanolamine, diethylenetriamine, N-aminoethylpiperazine, N-hydroxyethylpiperazine, aminoethylethanolamine and higher boiling components.

Within the zone 70, the liquid reaction product 68 is separated under distillation conditions adjusted to provide an overhead aqueous ammonia distillate fraction discharged by a line 72 controlled by a valve 73. Preferably, at least a portion of the fraction 72 is recycled to the aqueous ammonia charge line 58 by a branch line 71 controlled by a valve 77.

A bottoms fraction is discharged from zone 70 by a line 79 leading to a manifold 81 to which a stream 124 (obtained in a manner to be described) is also preferably charged. The resultant mixture is discharged from the manifold 81 by a line 74 leading to a second distillation zone 76 where it is fractionated under distillation conditions adjusted to provide an overhead water fraction 78 and a substantially anhydrous bottoms fraction which is discharged by a line 80.

The line 80 leads to a third distillation zone 82 where the bottoms fraction from column 76 is separated under distillation conditions adjusted to provide a distillate fraction 84 containing substantially all of the piperazine present in the fraction 80. It will be understood that the distillate fraction 80 will also contain lower boiling by-products such as ethylenediamine. Since the piperazine content of the fraction 84 is optimized, it may also contain higher boiling by-products, such as monoethanolamine, diethylene triamine, etc.

A bottoms fraction 86 comprising higher boiling by-products such as diethylenetriamine, aminoethylethanolamine, N-hydroxyethylpiperazine, etc., is discharged by a line 86 controlled by a valve 87. Preferably, at least a portion of the fraction 86 is charged by a branch line 89 controlled by a valve 91 to the manifold 90.

The fraction 84 is charged to a fourth distillation zone 92 wherein an overhead distillate fraction is separated which is composed principally of ethylenediamine, which is discharged by a line 94 controlled by a valve 95. Preferably, all or a part of fraction 94 is recycled to reactor 50 by way of a recycle branch line 96 controlled by a valve 97 leading to the manifold 41. A bottoms fraction 98 is discharged from zone 92, the fraction 98 containing substantially all of the piperazine charged to column 92. Fraction 98 is charged to a fifth distillation zone 11 wherein it is separated into a distillate, substantially pure piperazine product fraction 13 and a bottoms fraction discharged by a line 17 controlled by a valve 19 which comprises piperazine and most of the diethylenetriamine, N-aminoethylpiperazine, etc. taken overhead by the line 84 from the column 82. All or a part of the fraction 17 is preferably charged to the manifold 90 by a branch line 21 controlled by a valve 23.

In accordance with the present invention the fraction 42 and all or part of the fractions 86 and 17 are discharged from the manifold 90 by a line 25 leading to a second reactor 100 containing a hydrogenation catalyst of the type used in the first reaction 50. Hydrogen is also charged to the second reactor 100 by way of a charge line 102 controlled by a valve 103 and, preferably, ammonia as aqueous ammonia is charged to the reactor 100 by way of line 106 controlled by a valve 108. The use of ammonia in the zones 50 and 100 is not essential, however, and it is within the spirit of the present invention to conduct the reductive aminations in zones 50 and 100 in the absence of added ammonia if desired.

Within the second reactor, too, suitable reaction conditions are established including, for example, a pressure of about 2,000 to about 3,000 p.s.i.g., a temperature of about 150°–200° C. in a space velocity of about .5 to about 1.0 lb. of feed per hour per lb. of catalyst. Under these reaction conditions, at least 80% of the aminoethylethanolamine in the fraction 25 charged to the reactor 100 will be converted as will a significant portion of the higher ethylenediamine ethoxylation products. In the absence of added ammonia, the principal conversion products will be piperazine and N-hydroxyethylpiperazine and residue. When ammonia is a co-reactant, a significant quantity of N-aminoethylpiperazine will also be produced.

A second reaction product from the second reactor 100 is discharged by way of the line 105 leading to a surge drum 104 from which hydrogen is removed by way of the line 116 for recycle to the line 102.

The liquid reaction product is discharged from the drum 104 by way of the line 118 containing a pressure reduction valve 120 leading to a sixth distillation zone 122. The liquid reaction product 118 is fractionated in the sixth distillation zone 122 under distillation conditions selected to provide an aqueous ammonia distillate fraction discharged by line 125 controlled by a valve 127. Suitably, at least a portion of the fraction 125 is recycled to the charge line 106 for the second reactor 100 by way of a branch line 128 controlled by a valve 130.

The bottoms from sixth distillation zone 122 are charged by a line 132 to a seventh distillation zone 134 (which may suitably be a vacuum distillation zone) where it is fractionated under distillation conditions selected to provide a distillate fraction comprising reaction components such as water, piperazine, etc., boiling below the boiling point of N-hydroxyethyl and N-aminoethylpiperazine. This distillate fraction is discharged from zone 134 by a line 136 controlled by a valve 138. Although all or a portion of the fraction 136 may be purged from the system, preferably, it is recycled by way of a branch line 124 controlled by a valve 129 to the manifold 81 described above. The higher boiling products from the distillation column 134 are discharged by way of a line 140 leading to an eighth distillation column 142 where it is separated into a distillate fraction 144 comprising essentially of N-aminoethylpiperazine, N-hydroxyethylpiperazine, and a minor amount of other impurities including some residual unreacted aminoethylethanolamine. Since this mixture is useful as a feedstock for the preparation of triethylenediamine, the fraction 144 is suitably recovered as a product. The higher boiling fraction is discharged from the column 142 as residue by way of line 146.

Fraction 144 contains both N-hydroxyethylpiperazine as N-aminoethylpiperazine. Special distillation procedures (not shown) can be used, if desired, in order to permit the separate recovery of purified N-aminoethylpiperazine and purified N-hydroxyethylpiperazine free of aminoethylethanolamine from this fraction, such as, for example, those disclosed in Cour Patent No. 3,331,756 or Cour Patent No. 3,341,600 (not shown).

The invention will be further illustrated in connection with the following specific examples which are given by way of the illustration and not as limitations on the scope of this invention.

The hydrogenation catalyst used in the following example was a hydrogen - prereduced nickel - copper-chromia catalyst containing, on an oxide-free basis, about 75 mol percent nickel, about 23 mol percent copper and about 2 mol percent chromium. Where parts are given in the following examples, they are parts by weight.

Example I.—In a series of experiments, a tubular reactor was filled with a hydrogenation catalyst, as above described, and pressured to a reaction pressure to about 2,500 p.s.i.g. The hydrogen flow rate through the reactor was about 30 to 40 cubic feet of hydrogen per hour. The liquid feed composition was about 33 wt. percent ammonia, about 36.2 wt. percent water and about 30.5 wt. percent of a fraction 42 prepared in the manner described above in connection with the drawing, which contained about 40 wt. percent aminoethylethanolamine and about 60 wt. percent of heavier components, principally the di-, tri- and tetrahydroxyl derivatives of ethylenediamine.

The results obtained in five representative runs are set forth in Table 1, which also includes the reaction temperature and space velocity employed.

TABLE 1

Reactor: Tubular vessel, filled with catalyst, continuous flow
Catalyst: Nickel, copper, chromia
Reactor pressure: 2,500 p.s.i.g.
Hydrogen rate: 30-40 s.c.f.h.
Liquid feed composition: 33.3% ammonia, 36.2% water and 30.5% AEEA bottoms, the latter consisting of 40% AEEA and 60% heavier components

| Run No. | 1 | 2 | 3 | 4 | 5 |
|---|---|---|---|---|---|
| NB | 3,064–11-10 | 3,064–11-30 | 3,064–12-18 | 3,064–12-29 | 3,064–13-22 |
| Reactor temp., °C | 173 | 174 | 199 | 199 | 159 |
| S.V., g./hr. ml. cat | 2.0 | 1.0 | 1.0 | 2.0 | 1.0 |
| Yield, lb./lb. AEEA bottoms: | | | | | |
| Lights | .04 | .05 | .18 | .14 | .04 |
| Piperazine | .21 | .22 | .11 | .19 | .21 |
| Aminoethylpiperazine | .04 | .10 | .08 | .13 | .02 |
| Hydroxyethylpiperazine | .35 | .36 | .09 | .20 | .38 |
| Residue | .26 | .13 | .26 | .16 | .30 |
| Total | .90 | .86 | .72 | .82 | .95 |

As will be seen from Table 1, significant quantities of piperazine, N-aminoethylpiperazine and N-hydroxyethylpiperazine were formed. It will also be observed that at the lower temperature and at a space velocity of one gram of feed per hour per milliliter of catalyst, the principal reaction products are piperazine and N-hydroxyethylpiperazine. At a higher temperature and at a space velocity of two grams of feed per hour per milliliter catalyst (Run 4), significant quantities of N-aminoethylpiperazine were also formed but there was a lesser formation of both piperazine and N-hydroxyethylpiperazine.

Example II.—In a further series of experiments, using the reactor and catalyst of Example I both with and without ammonia, a series of runs were made using the feed components and the reaction conditions set forth in Table 2.

The fraction 42 used for this series of experiments contained only about five wt. percent of aminoethylethanolamine and was composed principally of the di-, tri- and tetrahydroxyethyl derivatives of ethylenediamine.

TABLE 2.—REACTION OF AEEA BOTTOMS STRIPPED TO 5% AEEA [1]

Catalyst: Nickel, Copper, Chromia

| | Feed composition, wt. percent | | | Space velocity, g./ml. cat.-hr. | Temp., °C | Yields (lb./100 lbs.) AEEA residue | | |
|---|---|---|---|---|---|---|---|---|
| | AEEA [1] bottoms | H₂O | Ammonia | | | PIP [2] | HEP [3] | AEP [4] |
| Run No.: | | | | | | | | |
| 1 | 50 | 50 | | 1.9 | 150 | 1.6 | 29.2 | 0.4 |
| 2 | 50 | 50 | | 1.9 | 165 | 3.0 | 26.7 | 0.6 |
| 3 | 50 | 50 | | 1.9 | 182 | 11.5 | 19.2 | 1.2 |
| 4 | 50 | 50 | | 2.1 | 140 | .8 | 18.9 | |
| 5 | 50 | 50 | | 0.9 | 150 | 1.5 | 32.5 | 0.4 |
| 6 | 50 | 50 | | 1.0 | 150 | 4.3 | 33.7 | 0.5 |
| 7 | 50 | 50 | | 0.6 | 152 | 5.2 | 34.3 | 0.4 |
| 8 | 33 | 33 | 33 | 1.1 | 150 | 5.6 | 40.8 | 1.9 |
| 9 | 33 | 67 | | 1.0 | 150 | 5.1 | 39.3 | |
| 10 | 33 | 33 | 33 | 1.0 | 165 | 7.0 | 44.4 | 6.8 |
| 11 | 33 | 67 | | 1.0 | 165 | 4.6 | 20.4 | 0.7 |
| 12 | 33 | 33 | 33 | 0.9 | 165 | 7.4 | 43.4 | 7.4 |

[1] Abbreviation for aminoethylethanolamine.
[2] Abbreviation for piperazine.
[3] Abbreviation for N-hydroxyethylpiperazine.
[4] Abbreviation for N-aminoethylpiperazine.

Turning now to Table 2, it will be observed that in the absence of ammonia, there was only a minor yield of aminoethylpiperazine. A greater yield of N-aminoethylpiperazine was obtained only in Runs 10 and 12 wherein ammonia was employed at reaction temperature in excess of about 150° C.

Example III.—In a third series of experiments, the fraction 42 of Example II was conducted in the reactor of Example I using the catalyst of Example I at a pressure of about 2,500 p.s.i.g. and a temperature of about 160°–170° C., a hydrogen charge rate of 72 s.c.f./min. and a space velocity for the total liquid feedstock of about 1.0 gr. of feed per hour per ml. of catalyst.

The composition of the feedstock and the results obtained are set forth in Table 3.

TABLE 3

| Feed composition, weight percent | | | Reactor temp., °C. | Reactor product yield, lbs./100 lbs. of AEEA bottoms, product fraction | | | | | | | |
|---|---|---|---|---|---|---|---|---|---|---|---|
| AEEA bottoms | Water | Ammonia | | Lights | Water | PIP | HEP | AEP | DHEEDA Unknown and Di HEP | | Unknowns | Residue |
| 30.2 | 36.5 | 33.3 | 170 | 5.13 | 6.75 | 7.80 | 44.45 | 4.26 | 1.65 | 13.38 | 1.39 | 15.02 |
| 30.2 | 36.5 | 33.3 | 160 | 0.79 | 4.88 | 5.15 | 32.28 | 3.12 | 1.74 | 36.46 | 1.79 | 12.79 |
| 33.3 | 33.3 | 33.3 | 165 | 1.51 | 6.48 | 4.17 | 42.48 | 4.34 | 0.05 | 24.56 | .04 | 16.37 |

In Table 3, a product fraction is shown which is equivalent to the product fraction 144 of the drawing. It is to be observed that this fraction represents about 35 wt. percent to 50 wt. percent yield, based on the feed of a product useful in the preparation of triethylenediamine. This demonstrates the efficient manner in which an otherwise intractable residue fraction (i.e., fraction 42 of the drawing) may be converted with good selectivity into a useful and significantly more valuable product.

I claim:

1. In a method which comprises the steps of reacting ethylene oxide with a molar excess of ethylenediamine forming thereby a reaction product mixture comprising unreacted ethylenediamine, aminoethylethanolamine and higher molecular weight condensation products of ethylene oxide and ethylenediamine comprising di-, tri- and tetrahydroxyethyl derivatives of ethylenediamine, then separating from said reaction product mixture the unreacted ethylenediamine fraction and at least a major portion of the aminoethylethanolamine fraction the improvement which comprises then contacting the remaining said reaction product mixture with hydrogen in the presence of a hydrogenation catalyst at a temperature within the range of about 100° C. to 220° C. at a pressure within the range of about 2,000 to about 10,000 p.s.i.g., the hydrogen partial pressure constituting at least 80% of the total pressure under conversion conditions forming thereby a second reaction product mixture comprising piperazine, N-hydroxyethylpiperazine, and N-aminoethylpiperazine and recovering at least a portion of said piperazine, N-hydroxyethylpiperazine and N-aminoethylpiperazine.

2. A method as in claim 1 wherein said contacting is conducted in the presence of from about 50 to about 200 wt. percent of water and from about 50 to about 200 wt. percent of ammonia.

3. A method as in claim 2 wherein said contacting is conducted at a temperature within the range of about 150° C. to 200° C. at a pressure within the range of about 2,000 to 3,000 p.s.i.g. at a space velocity in the range of about .6 to 2.1 grams of feed per ml. of catalyst per hour, and wherein the hydrogenation catalyst is nickel-copper-chromia catalyst comprising a mol percent basis, based on the metals, about 60–80% of nickel, about 14–37% mol of copper and about 1–5% mol of chromium, present as chromia.

4. A method as in claim 1 wherein said major portion of the aminoethylethanolamine fraction is contacted with a hydrogenation catalyst in the presence of hydrogen under conversion conditions forming thereby a reaction mixture comprising piperazine, amine components having boiling points below the boiling point of piperazine and amine components having boiling points higher than the boiling point of piperazine comprising aminoethylethanolamine, hydroxyethylpiperazine and N-aminoethylpiperazine, then separating from said reaction mixture the piperazine fraction and that fraction having boiling points below the boiling point of piperazine and admixing the fraction having boiling points higher than the boiling point of piperazine with the remaining said reaction product mixture of claim 1 prior to contacting said reaction product mixture of claim 1 with hydrogen.

References Cited

UNITED STATES PATENTS

| 3,112,318 | 11/1963 | Lemon et al. | 260—268 |
| 3,285,920 | 11/1966 | Muhlbauer et al. | 260—268 |
| 3,297,700 | 1/1967 | Muhlbauer et al. | 260—268 |
| 3,383,417 | 5/1968 | Lichtenwalter | 260—268 X |

DONALD G. DAUS, Primary Examiner

U.S. Cl. X.R.

260—584